(12) United States Patent
Gu et al.

(10) Patent No.: US 11,294,226 B2
(45) Date of Patent: Apr. 5, 2022

(54) LIQUID CRYSTAL DISPLAY, DISPLAY METHOD AND TERMINAL

(71) Applicant: BEIJING XIAOMI MOBILE SOFTWARE CO., LTD., Beijing (CN)

(72) Inventors: Jianglin Gu, Beijing (CN); Chiafu Yen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/587,148

(22) Filed: Sep. 30, 2019

(65) Prior Publication Data

US 2020/0249525 A1 Aug. 6, 2020

(30) Foreign Application Priority Data

Jan. 31, 2019 (CN) .......................... 201910100721.2

(51) Int. Cl.
*G02F 1/13357* (2006.01)
*G02F 1/1335* (2006.01)

(52) U.S. Cl.
CPC .. *G02F 1/133602* (2013.01); *G02F 1/133512* (2013.01); *G02F 1/133526* (2013.01)

(58) Field of Classification Search
CPC ......... G02F 1/133526; G02F 1/133603; G02F 1/133621; G02F 1/133601; G02F 1/133622; G02F 1/133388; G02F 1/133391; G02F 1/133618
See application file for complete search history.

(56) References Cited

U.S. PATENT DOCUMENTS

| 10,534,221 | B1 * | 1/2020 | Zhu | .................. G02F 1/133602 |
| 10,768,356 | B1 * | 9/2020 | Zhang | .................. G02B 6/0035 |
| 2013/0015482 | A1 * | 1/2013 | Su | .......................... H01L 33/58 |
| | | | | 257/98 |
| 2016/0161664 | A1 * | 6/2016 | Ishida | ..................... G02B 6/00 |
| | | | | 359/230 |

(Continued)

FOREIGN PATENT DOCUMENTS

| CN | 108469704 A | * | 8/2018 |
| CN | 108810199 A | * | 11/2018 |
| CN | 208384467 U | | 1/2019 |

(Continued)

OTHER PUBLICATIONS

Espacenet English machine translation of CN108810199A (Year: 2018).*

(Continued)

*Primary Examiner* — Edward J Glick
*Assistant Examiner* — David Y Chung
(74) *Attorney, Agent, or Firm* — Syncoda LLC; Feng Ma

(57) ABSTRACT

A liquid crystal display includes: a backlight layer, a filter layer, and an image display element. The backlight layer is formed with a first light transmitting hole. The filter layer is formed with a colorless region corresponding to the first light transmitting hole. The image display element is disposed at the first light transmitting hole, and light of the image display element is projected on the liquid crystal display and corresponds to the colorless region. The liquid crystal display can realize the full screen display effect, and image capturing functions of the lens suitable for the full screen display.

19 Claims, 6 Drawing Sheets

(56) References Cited

U.S. PATENT DOCUMENTS

2020/0225535 A1* 7/2020 Wang .................. H01L 27/3234
2021/0072594 A1* 3/2021 Zhang ............... G02F 1/133603

FOREIGN PATENT DOCUMENTS

| EP | 3187923 A1 | 7/2017 |
| EP | 3422091 A1 | 1/2019 |

OTHER PUBLICATIONS

Espacenet English machine translation of CN108469704A (Year: 2018).*

Extended European Search Report in application No. EP19211873, dated May 28, 2020.

* cited by examiner

LIQUID CRYSTAL DISPLAY, DISPLAY METHOD AND TERMINAL

CROSS-REFERENCE TO RELATED APPLICATIONS

The present application claims priority to Chinese Patent Application 201910100721.2 filed on Jan. 31, 2019, the disclosure of which is hereby incorporated by reference in its entirety.

BACKGROUND

In recent years, a full screen has become a new trend in the development of smart phones. However, the smart phones usually have components such as a front camera.

SUMMARY

The present disclosure generally relates to the field of terminal technology, and more particularly, to a liquid crystal display, a display method and a terminal.

Embodiments of the present disclosure provide a liquid crystal display, a display method, and a terminal.

According to a first aspect, embodiment of the present disclosure provide a A liquid crystal display, wherein the liquid crystal display includes:

a backlight layer, formed with a first light transmitting hole;

a filter layer, formed with a colorless region corresponding to the first light transmitting hole; and an image display element, disposed at the first light transmitting hole, light of the image display element being projected on the liquid crystal display and corresponding to the colorless region.

In some embodiments, the image display element includes a color display state and/or a black and white display state.

In some embodiments, the image display element includes:

a sub-image display element, and a light gathering member disposed above a light-emitting surface of the sub-image display element, wherein the light gathering member is disposed to uniformly project light emitted from the sub-image display element onto the liquid crystal display and to correspond to the colorless region.

In some embodiments, the liquid crystal display further includes a liquid crystal driving element, wherein a liquid crystal layer in the liquid crystal display includes a light transmitting state caused by driving of the liquid crystal driving element.

In some embodiments, the liquid crystal layer further includes a light shielding state caused by driving of the liquid crystal driving element, and a light transmittance under the light shielding state is smaller than a light transmittance under the light transmitting state.

In some embodiments, the liquid crystal display further includes a display driving element, and the display driving element drives the image display element to be turned on or off.

In some embodiments, an inner polarizing layer of the liquid crystal display is formed with a second light transmitting hole corresponding to the first light transmitting hole.

In some embodiments, the sub-image display element is selected from at least one of: a mini light emitting diode element or element array, a micro light emitting diode element or element array, a liquid crystal display, and an organic light emitting diode array.

In some embodiments, the light gathering member is selected from at least one of: a prism, a microlens array, and a lens array.

In some embodiments, the image display element is located in a surrounding region of the first light transmitting hole below the backlight layer; or the image display element is located within the first light transmitting hole.

In some embodiments, a liquid crystal driving element of the liquid crystal display is connected to a display driving element of the image display element to realize communication, the liquid crystal driving element and the display driving element are configured such that the liquid crystal display realizes display content synchronization in a region outside the colorless region and the image display element.

According to a second aspect, some embodiments of the present disclosure provide a display method, applied to the liquid crystal display provided by the above first aspect, the method including:

a backlight layer emitting light, the light being displayed in a region of the liquid crystal display outside the colorless region;

an image display element emitting light and displaying, and a display image being projected on the liquid crystal display and corresponding to the colorless region.

In some embodiments, the image display element emitting light includes: the image display element displaying a color image, or the image display element displaying a black and white image.

In some embodiments, the image display element emitting light and displaying includes: a liquid crystal driving element driving liquid crystals of a liquid crystal layer at the colorless region to be turned to a light transmitting state, and changing a polarization angle of the light emitted by the image display element, such that the light penetrates an outer polarizing layer.

In some embodiments, the method further includes: a liquid crystal driving element of the liquid crystal display communicating with a display driving element of the image display element to transmit display information, and display contents of a region of the liquid crystal display outside the colorless region and the image display element synchronize.

In some embodiments, the method further includes:

the backlight layer emitting light, the light being displayed on the region of the liquid crystal display outside the colorless region;

turning off the image display element, liquid crystals in the liquid crystal layer corresponding to the colorless region being turned to a light transmitting state to realize light collection.

In some embodiments, the method further includes:

turning off the backlight layer and the image display element, liquid crystals in the liquid crystal layer corresponding to the colorless region being turned to a light shielding state to realize screen off.

According to a third aspect, some embodiments of the present disclosure provide a terminal, including: a lens, and the liquid crystal display provided by the above first aspect, wherein the lens is disposed corresponding to a first light transmitting hole in the liquid crystal display, and the image display element is disposed in a surrounding region of the lens.

In some embodiments, the image display element is disposed around the lens; or the image display element is disposed on one side of the lens; or the image display element is formed with a hollow region corresponding to the first light transmitting hole, and the lens is inserted into the hollow region.

It should be understood that, the above general description and following detailed description are intended to be illustrative and not restrictive.

The liquid crystal display provided by embodiments of the present disclosure at least has following beneficial effects.

An image is normally displayed in a portion of the liquid crystal display provided by the embodiment of the present disclosure outside the colorless region, and an image is displayed in a portion of the liquid crystal display corresponding to the colorless region by means of an image display element, thereby realizing a full screen display effect of the liquid crystal display. Moreover, the first light transmitting hole in the backlight layer and the colorless region in the filter layer have light transmitting property, so when the liquid crystal display cooperates with the lens, the lens is placed under the colorless region, so that the lens receives the light penetrating through the colorless region, and then achieves the image acquisition function.

As such, the liquid crystal display provided by the embodiment of the present disclosure takes into account the full screen display effect and the image acquisition function.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain principles of various embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Nowadays, one of difficulties in technologies for achieving the full screen in a true sense is the fact that a photographing function and a full screen display function cannot be realized at the same time.

Therefore, when the full screen is used, how to ensure the normal use of components such as the front camera becomes a key issue. After study during the solving of the above technical problems, as for a mobile phone using a Liquid Crystal Display (LCD) as a screen, the inventors consider to dispose a camera beneath the liquid crystal display in order to realize the full screen.

However, in order to dispose the camera beneath the liquid crystal display, a hole needs to be opened in the liquid crystal display and then the camera is placed in the hole. Although the camera can capture an image in front of the mobile phone through the hole, no display function can be realized at the hole.

Therefore, no image can be displayed at a position corresponding to the hole when an image is displayed on the liquid crystal display, so the overall full screen display effect cannot be achieved.

On the other hand, in order to achieve the full screen display effect, some technical solutions are provided to change a front photographing portion into a pop-up structure by a hardware structure or to adopt some other manners, but sacrifices will have to be made no matter in costs or production processes and user experience.

Figure 6:
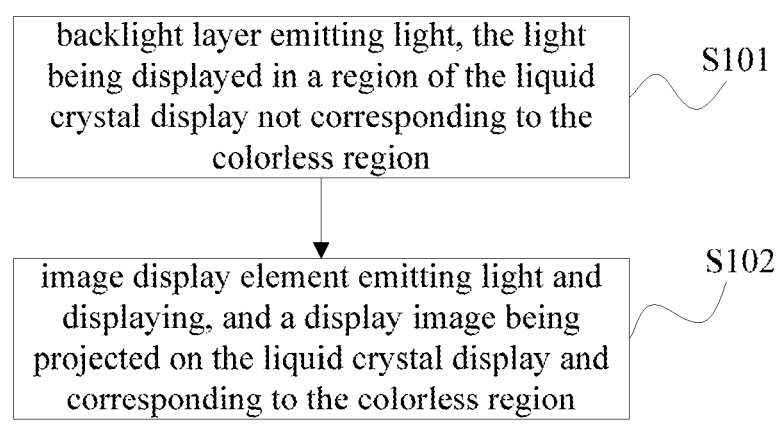
FIG. 6 is a flowchart illustrating a display method according to some embodiments.
Figure 7:
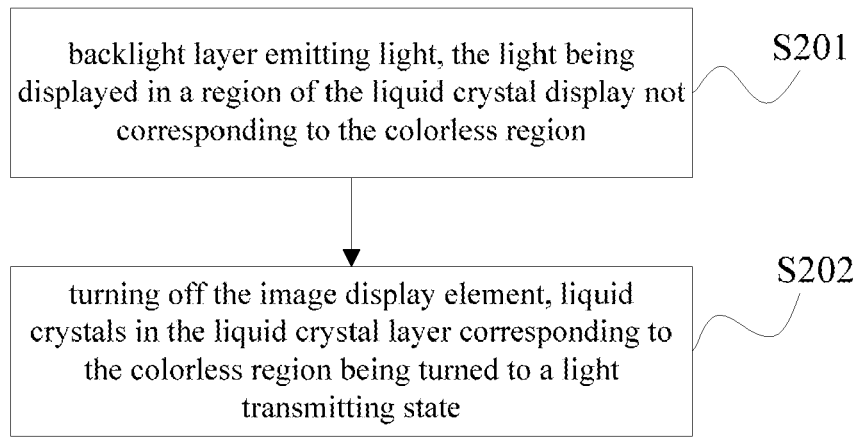
FIG. 7 is a flowchart illustrating a display method according to some embodiments.
Figure 8:
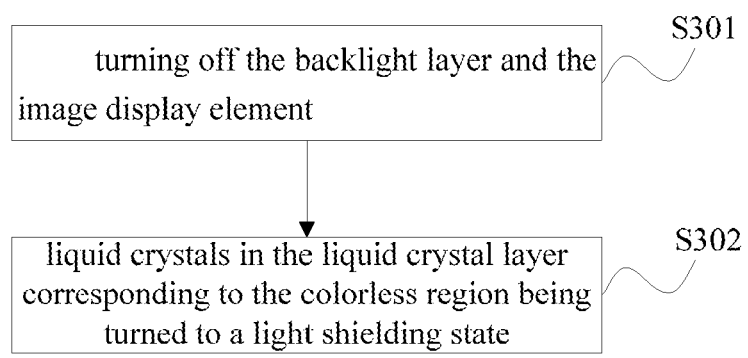
FIG. 8 is a flowchart illustrating a display method according to some embodiments.
Figure 9:
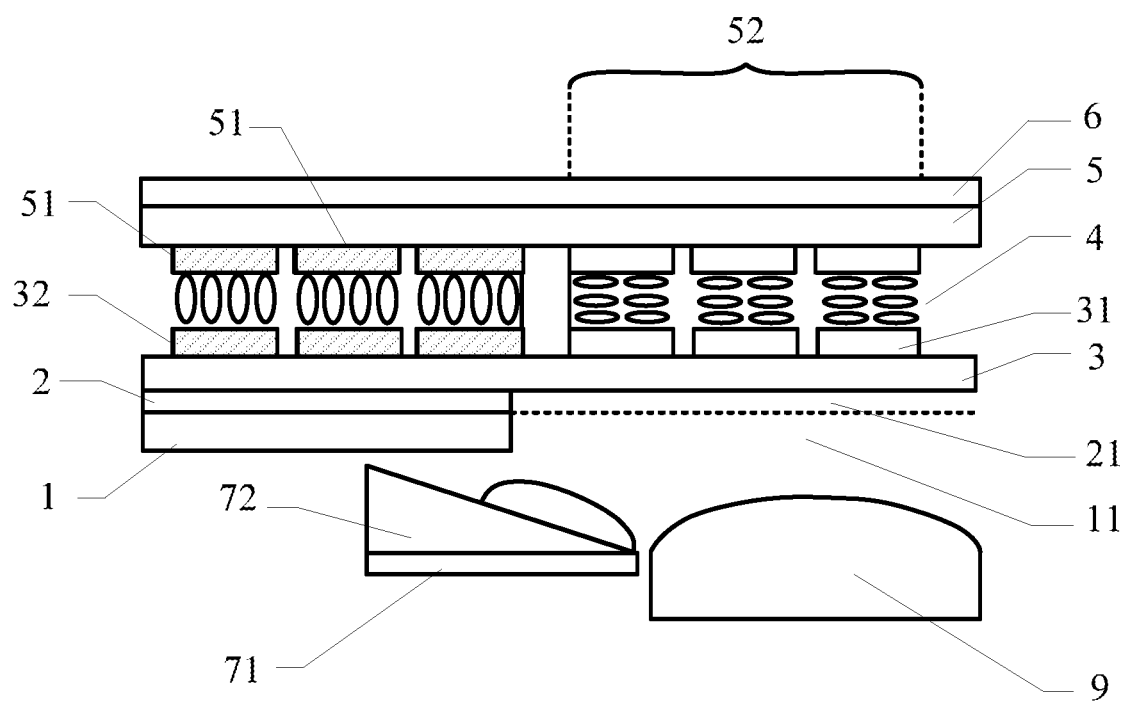
FIG. 9 is a partial structural schematic view of a terminal according to some embodiments.
Figure 10:
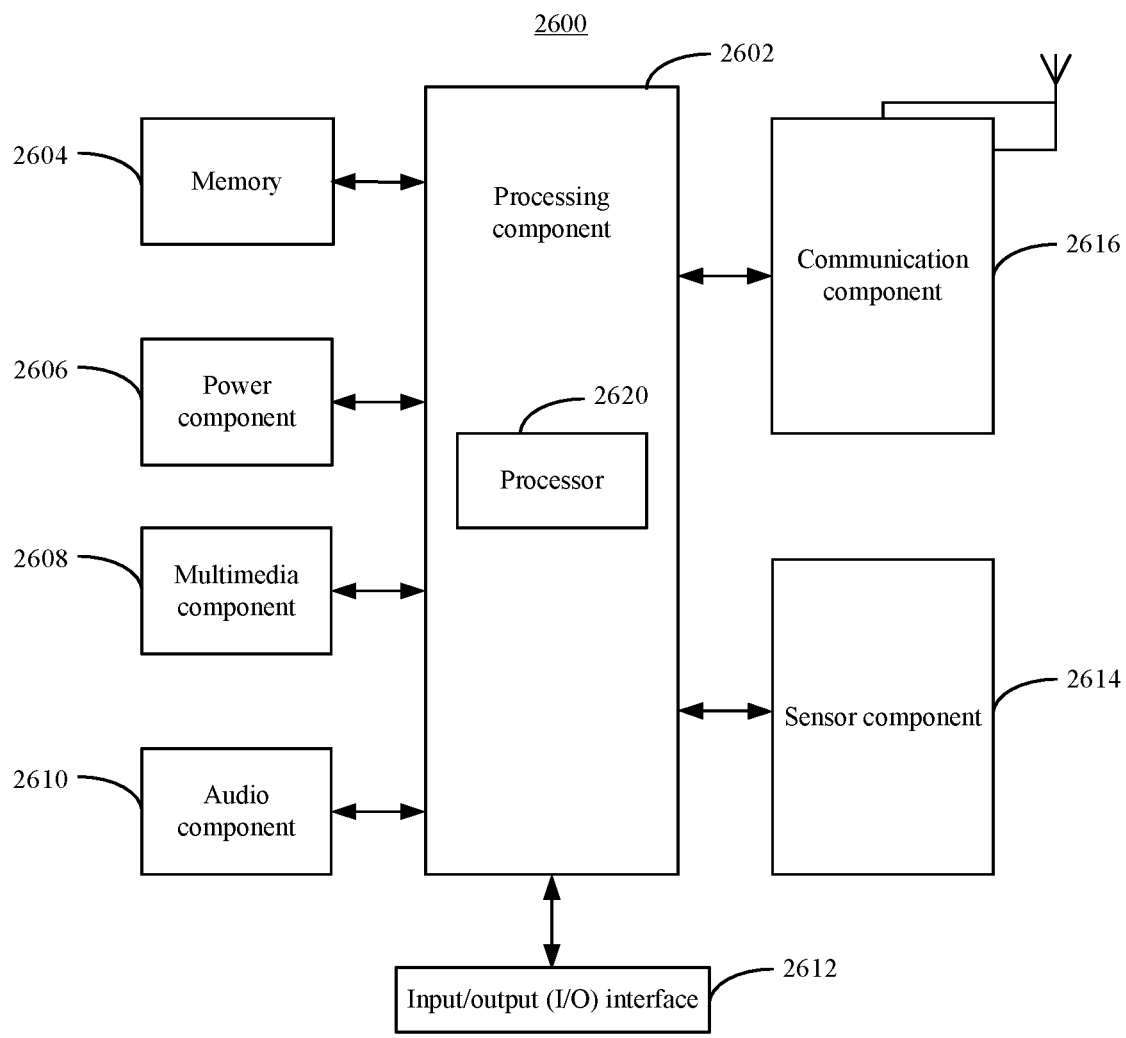
FIG. 10 is a block diagram of a terminal according to some embodiments.

Various embodiments of the present disclosure provide a liquid crystal display, a display method and a terminal. FIGS. 1-5 are structural schematic diagram illustrating a liquid crystal display according to some embodiments. FIGS. 6-8 are flowcharts illustrating a display method according to some embodiments. FIGS. 9 and 10 are schematic views of a terminal according to some embodiments.

Figure 1:
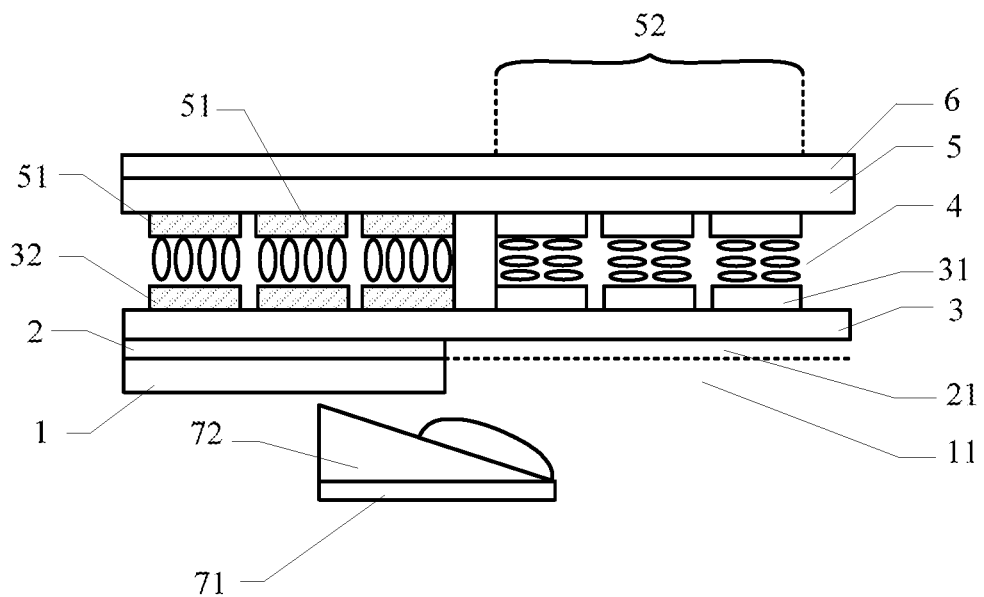
FIG. 1 is a structural schematic diagram illustrating a liquid crystal display according to some embodiments.
Figure 2:
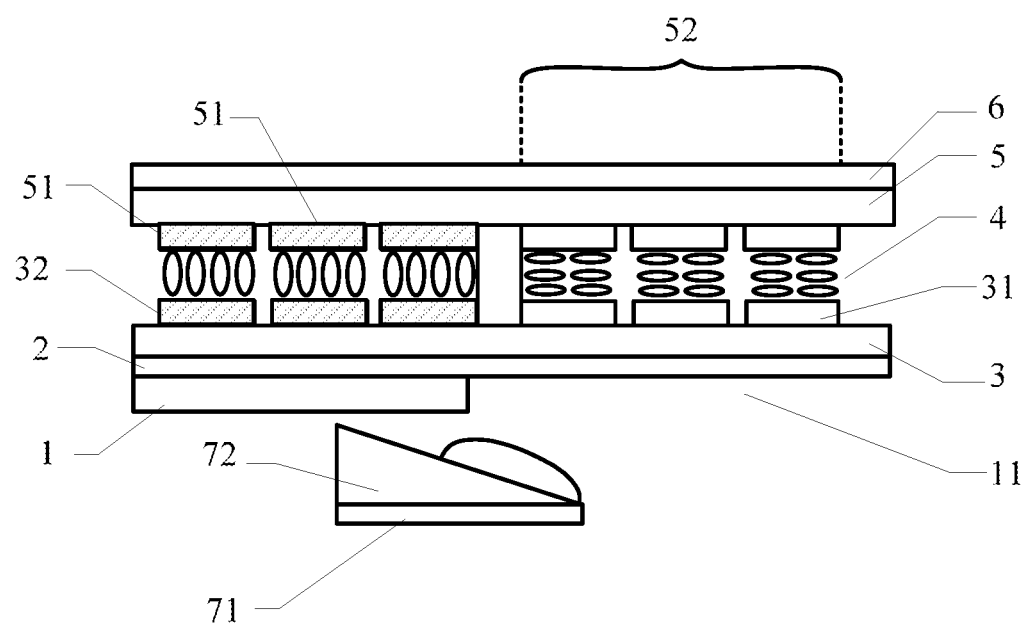
FIG. 2 is a structural schematic diagram illustrating a liquid crystal display according to some other embodiments.

According to a first aspect, some embodiments of the present disclosure provides a liquid crystal display. As shown in FIGS. 1 and 2, the liquid crystal display includes: a backlight layer 1, an inner polarizing layer 2, an array substrate 3, a liquid crystal layer 4, a filter layer 5, and an outer polarizing layer 6 which are sequentially disposed.

When the liquid crystal display is in operation, the backlight layer 1 emits light to provide a light source for the liquid crystal display, and the backlight layer 1 usually emits white light.

The inner polarizing layer 2 allows light having a polarization angle emitted from the backlight layer 1 to pass through.

The array substrate 3 includes a driving element for driving the rotation of liquid crystals in the liquid crystal layer 4 to further change the polarization angle of the light passing through. In the embodiment of the present disclosure, the array substrate 3 is a transparent component.

The filter layer 5 includes a color filter 51. The filter layer 5 generally includes red, green and blue filters, which helps to realize the color display effect of the liquid crystal display.

A polarization direction of the outer polarizing layer 6 is different from that of the inner polarizing layer 2, and they are generally perpendicular to each other. According to this, light having a polarization angle the same as a polarization direction of the outer polarizing layer 6 after it passes through the liquid crystal layer 4 can be emitted out of the liquid crystal display.

It can be understood that an intensity of light emitted from the liquid crystal display can be changed by the liquid crystal layer 4, so that the liquid crystal display has a display effect of brightness and darkness, and an image display function is realized by the color filtering of the filter layer 5.

In some embodiments of the present disclosure, the backlight layer 1 is formed with a first light transmitting hole 11. The first light transmitting hole 11 is a region that does not emit light and allows light to pass through.

For example, the first light transmitting hole 11 is a through hole on the backlight layer 1. Alternatively, the first light transmitting hole 11 is formed of a nonluminous transparent material in a preset region of the backlight layer 1. Alternatively, the first light transmitting hole 11 is a blind hole, and a portion on the backlight layer 1 corresponding to the first light transmitting hole 11 is made of a transparent material.

For example, the backlight layer 1 includes one or more first light transmitting holes 11. Moreover, a size and a shape of the first light transmitting hole 11 are not limited. In some implementations, one of the first light transmitting holes 11 can correspond to a plurality of external elements, such as lenses or the like.

The filter layer 5 is formed with a colorless region 52 corresponding to the first light transmitting hole 11. It can be understood that the colorless region 52 has light transmitting property.

As can be seen from the above, the filter layer 5 usually includes a color filter 51. In this case, according to some embodiments, the filter layer 5 forms a colorless region 52 corresponding to the first light transmitting hole 11 by not providing the color filter 51.

Alternatively, in some embodiments, the filter layer 5 forms a colorless region 52 corresponding to the first light transmitting hole 11 by providing transparent colorless filtering.

Further, the liquid crystal display further includes an image display element 7 disposed at the first light transmitting hole 11. Light of the image display element 7 is projected on the liquid crystal display and corresponds to the colorless region 52. The image display element 7 is capable of directly displaying an image and projecting the displayed image at a region of the liquid crystal display corresponding colorless region 52.

It should be noted that when the image display element 7 is displayed, liquid crystals in the liquid crystal layer 4 are in a light transmitting state, such that light emitted from the image display element 7 passes through. Moreover, since the first light transmitting hole 11 and the colorless region 52 in the filter layer 5 are in a colorless transparent state, the color and luminous flux of light emitted from the image display element 7 before and after passing through the colorless region 52 have no significant change. Further, the display effect of the image display element 7 at the region of the liquid crystal display corresponding to the colorless region 52 is secured.

Moreover, when the liquid crystal display is matched with the lens, the lens is disposed corresponding to the first light transmitting hole 11. At this time, the light penetrates the colorless region 52 and is then transmitted to the lens to be received by the lens, thus achieving the image acquisition function. It should be noted that since the colorless region 52 is in a transparent state, it will not interfere with passing of light, which achieves a high light transmittance, and in turn enables the lens to acquire a complete and clear image and optimize the image acquisition effect.

In addition, in the embodiment of the present disclosure, as a preferred solution, the colorless region 52 and the first light transmitting hole 11 have the same interface size and are disposed coaxially, so that the display image at a region of the liquid crystal display corresponding colorless region 52 and the display image at a region of the liquid crystal display not corresponding to the colorless region 52 form a whole, and no obvious boundary exists, the full screen display effect is improved.

An image is normally displayed in a portion of the liquid crystal display provided by the embodiment of the present disclosure which does not correspond to the colorless region 52, and an image is displayed in a portion of the liquid crystal display corresponding to the colorless region 52 by means of an image display element 7, thereby realizing a full screen display effect of the liquid crystal display.

Moreover, since both the colorless region 52 and the first light transmitting hole 11 have light transmitting property, the lens may be placed under the first light transmitting hole 11 when the liquid crystal display panel provided by the embodiment of the present disclosure cooperates with the lens and the like. In this case, the lens can receive the light that penetrates through the liquid crystal display from the colorless region 52 and the first light transmitting hole 11, thereby realizing the image acquisition function.

That is, the liquid crystal display provided by the embodiment of the present disclosure ensures that the lens normally acquires an image and realizes a full screen in a true sense on the premise of presenting a full screen display effect.

In some embodiments, as shown in FIGS. 1 and 2, optionally, the image display element 7 includes a sub-image display element 71 and a light gathering member 72. The light gathering member 72 is disposed on a light-emitting surface of the sub-image display element 71, to allow light emitted from the sub-image display element 71 to be uniformly projected on the liquid crystal display and corresponding to colorless region 52.

For example, the image display element 7 is selected from at least one of a mini Light-Emitting Diode (LED), a mini LED array, a Micro Light Emitting Diode (Micro LED), a Micro LED array, a liquid crystal display and an Organic Light-Emitting Diode (OLED) array. Also, the image display element 7 optionally has a flat light-emitting surface or a curved light-emitting surface, or the like.

For example, the light gathering member 72 can optionally be a prism, a microlens array, a lens array or a combination thereof. Of course, the light gathering member 72 can be modifications on a prism, a microlens, a microlens array, a lens array, which is not limited herein, as long as the light may be uniformly displayed on a region of the display screen corresponding to the first light transmitting hole. A shape of the light gathering member 72 is not limited. For example, the light gathering member 72 has a curved or inclined light incident surface and/or light-exiting surface, such that light emitted from the light emitting element at different positions of the image display element 7 is uniformly distributed in the colorless region 52 of the liquid crystal display, and the display effect of the colorless region 52 is optimized.

In one embodiment, image display element 7 includes a color display state for displaying color images, and/or a black and white display state for displaying black and white images. According to this, different display effects of the liquid crystal display are satisfied.

Further, the liquid crystal display further includes a display driving element for controlling the image display element 7 to be turned off or on. Optionally, the display driving element may be a driving circuit, a driving chip, or the like.

Further, the image display element 7 has following various alternative display modes.

The first mode: the image display element 7 displays a preset image. The preset image can be an image set in advance, for example, a pattern of a single color, or a preset pattern such as a terminal brand icon, a power icon, a Bluetooth icon, an icon of an application, or a pattern directly defined by the user.

The second mode: a display image of the image display element 7 is determined according to a display image of a portion around the colorless region 52 of the liquid crystal display.

For example, display parameters of an image around the colorless region 52 are obtained. The display parameters include, but not limited to, at least one of a brightness parameter and a color parameter. The image display element 7 is controlled to display images according to the obtained display parameters, so that the image displayed at the colorless region 52 and the image displayed around the colorless region 52 are formed almost as a whole.

For example, if there is an app interface in a current screen display interface, the colorless region 52 is surrounded by a pink background interface, in the second mode, pink and a brightness parameter value of the background interface can be obtained and a light emitting element is controlled according to the pink and the brightness parameter value to realize screen display at the colorless region 52, therefore a more coherent display effect is achieved.

The third mode: the image display element 7 is controlled to display images according to a display content at the colorless region 52 of the liquid crystal display.

For example, if the colorless region 52 is located in a region in which time is displayed in the liquid crystal display, a content to be displayed at the colorless region 52 such as "17:15" can be obtained and the image display element 7 is controlled to display images according to the content to be displayed, i.e., the display image "17:15". Of course, the display content at the colorless region 52 can also be part of a complete image, for example, the complete image is "17:15" and the content to be displayed is ":15".

In one embodiment, a liquid crystal driving element is included in an array substrate 3 of the liquid crystal display. Optionally, the liquid crystal driving element includes a first liquid crystal driving element 31 and a second liquid crystal driving element 32. The first liquid crystal driving element 31 is used to drive rotation of liquids crystal at the colorless region 52, and the second liquid crystal driving element 32 is used to drive rotation of liquids crystal at a region which does not correspond to the colorless region 52. Optionally, the liquid crystal driving element includes a thin film transistor in the array substrate 3.

Under the driving of the liquid crystal driving element, the liquid crystals in the liquid crystal layer 4 are rotated to exhibit a light transmitting state and a light shielding state. In the light transmitting state, the liquid crystals rotate and change the polarization angle of the incident light, so that a part or all of the light is emitted out of the liquid crystal display, and the liquid crystal layer 4 exhibits a high light transmittance state at this time. In the light shielding state, the liquid crystals rotate and change the polarization angle of the incident light to reduce the light emitted out of the liquid crystal display, and the liquid crystal layer 4 exhibits a low transmittance state at this time. Moreover, the preset definition of high light transmittance and low light transmittance is not limited, which may be set according to actual use conditions.

In use, when the image display element 7 displays an image, the liquid crystal driving element drives the liquid crystals to be turned to the light transmitting state, so that light emitted from the image display element 7 passes through the outer polarizing layer 6 as much as possible, thereby improving the display brightness of the liquid crystal display corresponding colorless region 52.

Moreover, when the liquid crystal display cooperates with the lens, the image display element 7 is turned off, and the liquid crystal driving element drives the liquid crystals to be turned to the light transmitting state, so that the light penetrates the liquid crystal display as much as possible, and is received by the lens to realize the image acquisition function.

When the liquid crystal display is turned off, that is, the liquid crystal display is a black screen, the backlight layer 1 and the image display element 7 are not illuminated. At this time, the liquid crystal driving element drives the liquid crystals to be turned to the light shielding state, so that the liquid crystal display tends to be dark as a whole, and the components under the liquid crystal display screen are shielded. In particular, the components located under the colorless region 52 are shielded, so that the liquid crystal display also exhibits an integrated full screen effect in a black screen state.

Further, the liquid crystal driving element of the liquid crystal display 1 is connected to the display driving element of the image display element, to transmit display information. In other words, the liquid crystal driving element may communicate with the display driving element. Further, the liquid crystal driving element and the display driving element may achieve that display contents of the region of the liquid crystal display outside the colorless region 52 and the image display element 7 synchronize, thereby optimizing the full screen display effect.

In one embodiment, as shown in FIG. 1, the inner polarizing layer 2 of the liquid crystal display is formed with a second light transmitting hole 21 corresponding to the first light transmitting hole 11.

Optionally, the second light transmitting hole 21 is formed by opening a through hole; or the second light transmitting hole 21 is formed by providing a transparent region having no polarization effect on the inner polarizing layer 2.

In this case, the light emitted from the image display element 7 sequentially passes through the first light transmitting hole 11 and the second light transmitting hole 21, and then enters the liquid crystal layer 4. When the image display element 7 displays an image, in order to ensure the display effect at the region of the liquid crystal display corresponding to colorless region 52, optionally, the liquid crystals in the liquid crystal layer 4 are rotated such that the polarization direction of the incident light is the same as the polarization direction of the outer polarizing layer 6. In this way, the light may exit out of the liquid crystal display as much as possible, which improves the display brightness and weakens the display effect difference of the region which corresponds to the corresponding colorless region and does not correspond to the colorless region in the liquid crystal display.

In one embodiment, as shown in FIG. 2, the inner polarizing layer 2 of the liquid crystal display covers the first light transmitting hole 11. In this case, the structural change of the liquid crystal display is reduced. It should be noted that, when the image display element 7 displays an image, the liquid crystals in the liquid crystal layer 4 are rotated, and the angle of the light incident through the inner polarizing layer 2 is changed. Preferably, the polarization angle of the light is the same as the polarization direction of the outer polarizing layer, and then as much light as possible exits out of the outer polarizing layer 6.

In addition, in one embodiment, the backlight layer 1 usually includes a light guide plate used for uniform light source illumination, so that when the first light transmitting hole 11 is formed, the first light transmitting hole 11 penetrates the light guide plate. Therefore, there may be a case where light in the light guide plate enters the first light transmitting hole 11, which may affect the display effect of the image display element 7.

Therefore, the liquid crystal display optionally further includes a light shielding member disposed on a side wall of the first light transmitting hole 11 (when the first light transmitting hole 11 is formed by opening a hole, the light shielding member is disposed on the side wall of the first light transmitting hole 11). The light shielding member blocks light emitted from the backlight layer 1, so that the first light transmitting hole 11 only allows light emitted from the image display element 7 to pass through, to ensure the display effect at the first light transmitting hole 11.

The arranged position and structure of the sub-image display element 71 and the light gathering member 72 in the image display element 7 have various options as follows.

Figure 3:
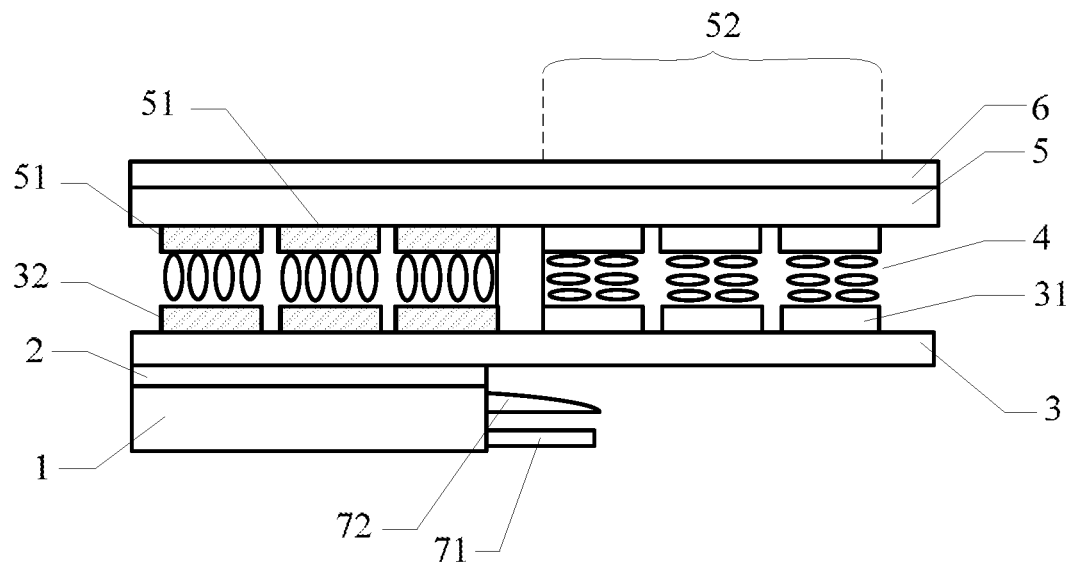
FIG. 3 is a structural schematic diagram illustrating a liquid crystal display according to some other embodiments.
Figure 4:
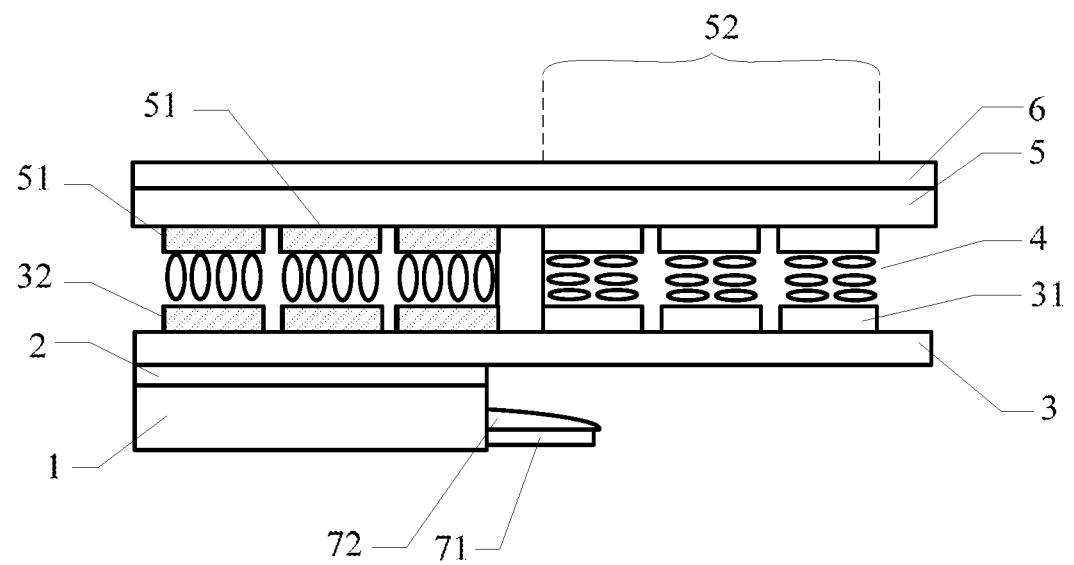
FIG. 4 is a structural schematic diagram illustrating a liquid crystal display according to some other embodiments.

As an example, as shown in FIGS. 3 and 4, the first light transmitting hole 11 is formed by opening a hole and the sub-image display element 71 and/or the light gathering member 72 are disposed in the first light transmitting hole 11 but their positions in the first light transmitting hole 11 are not particularly limited. For example, the sub-image display element 71 and the light gathering member 72 are disposed at an edge of the first light transmitting hole 11. Alternatively, the sub-image display element 71 and the light gathering member 72 are disposed in middle of the first light transmitting hole 11.

In the embodiment, the sub-image display element 71 and/or the light gathering member 72 are optionally connected to a side wall of the first light transmitting hole 11, to facilitate the installation and fixation. For example, they are connected to the first light transmitting hole 11 through interference fit or by an adhesive. Such connection manners facilitate installation of the light gathering member 72.

Further, optionally, as shown in FIG. 3, a gap exists between the sub-image display element 71 and the light gathering member 72; or as shown in FIG. 4, the light gathering member 72 is covered on the light-emitting surface of the sub-image display element 71.

As an example, the sub-image display element 71 and the light gathering member 72 are disposed under the liquid crystal display in a region surrounding the first light transmitting hole 11.

Figure 5:
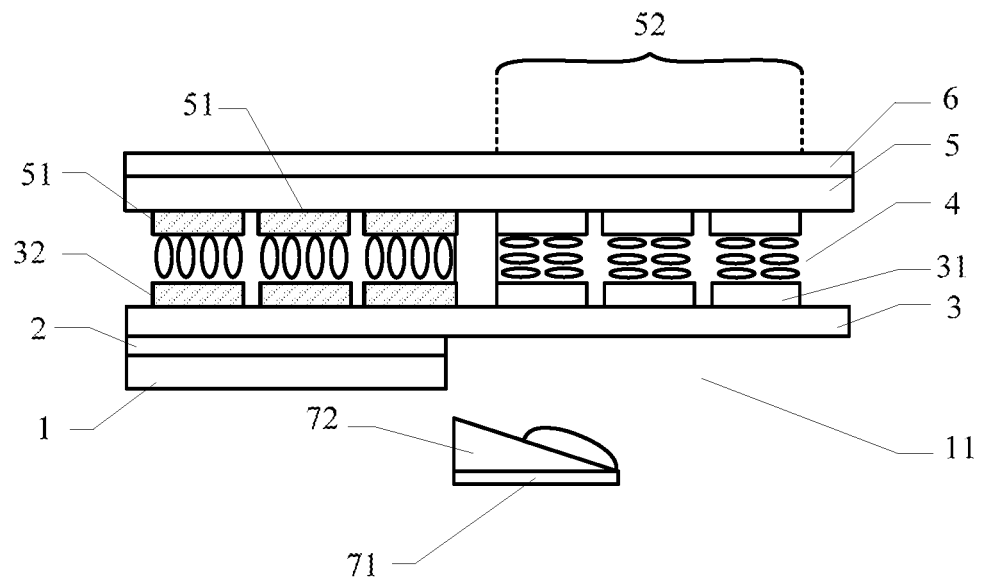
FIG. 5 is a structural schematic diagram illustrating a liquid crystal display according to some other embodiments.

For example, as shown in FIG. 5, the image display element 7 is located below the liquid crystal display and is disposed corresponding to the colorless region 52. Optionally, the image display element 7 and/or the light gathering member 72 are connected to a bottom surface of the backlight layer 3 of the display screen.

In the embodiment, the light gathering member 72 is optionally disposed on the sub-image display element 71. With this manner, light emitted from the sub-image display element 71 ejects out after passing through the light gathering member 72, and a gathering effect of the light gathering member 72 is fully achieved. For example, the light gathering member 72 is attached to the sub-image display element 71 by an adhesive, which can optionally be a transparent material to ensure the light-transmitting property of the light gathering member 72.

Of course, the light gathering member 72 is optionally connected to the side wall of the first light transmitting hole 11, and is located in the first light transmitting hole 11 and the sub-image display element 71 is disposed under the liquid crystal display. The installation positions and manners of the sub-image display element 71 and the light gathering member 72 relative to the first light transmitting hole 11 can be selected according to actual needs.

Alternatively, as shown in FIG. 1 or 2, the image display element 7 is disposed in a region surrounding the first light transmitting hole 11 below the liquid crystal display. Optionally, the sub-image display element 71 and the light gathering member 72 include a portion corresponding to the colorless region 52 and a portion laterally beyond the colorless region 52. Moreover, the sub-image display element 71 and the light gathering member 72 are optionally disposed around a preset region which is used to provide a lens.

What needs to be emphasized is that in the embodiment of the present disclosure, in addition to a lens and an image acquisition module, the liquid crystal display and other optical function modules can also be cooperated. By the liquid crystal display provided by the embodiment of the present disclosure, both the light-transmittance property and the full screen display effect are realized and user experience is improved.

According to a second aspect, embodiments of the present disclosure provide a display method, which is applied to the liquid crystal display according to the first aspect above-described. As shown in FIG. 6, the method includes following steps.

In step S101, the backlight layer emits light to display in a region of the liquid crystal display not corresponding to the colorless region.

Specifically, the backlight layer emits light and the liquid crystal driving element in the array substrate drives the liquid crystals to be rotated to adjust and control luminous flux of light exited out of the outer polarizing layer, so that the image display of the liquid crystal display not corresponding to the colorless region is achieved in cooperation with the filter layer.

In step S102, the image display element emits light and displays, and a display image is projected on the liquid crystal display and corresponds to the colorless region.

Specifically, the liquid crystals of the liquid crystal layer in the liquid crystal display corresponding to the colorless region are rotated to a light-transmitting state and change the polarization angle of the light emitted from the image display element, so that the light penetrates the outer polarizing layer. Therefore, the display at the colorless region of the liquid crystal display is realized.

In the embodiments, the rotation degree of the liquid crystals under the light transmitting state is not limited. For example, it is preferred that the polarization angle of the incident light due to the liquid crystals is the same as the polarization direction of the outer polarizing layer, such that the light emitted from the image display element entirely exits out of the outer polarizing layer. According to this, the display brightness can be improved, the display effect difference between the region which corresponds to the colorless region and does not correspond to the colorless region in the liquid crystal display is weakened, and the full screen display effect is optimized.

As an example, the image display element emitting light in step S102 includes: the image display element displaying a color image, or the image display element displaying a black and white image. According to this, the display effect of the liquid crystal display is enriched, and the display mode can be selected according to the actual situation when using.

In addition, the liquid crystal driving element of the liquid crystal display communicates with the display driving element of the image display element to transmit display information. The display content of the region of the liquid crystal display outside the colorless region and the image display element synchronize. Since the liquid crystal driving element and the display driving element can communicate, they can conduct information transmission, thereby achieving a complete and consistent full-screen display effect.

It should be noted that when the liquid crystal display and the image acquisition module are cooperated and both the image display element and the backlight layer emit light, the image acquisition module is turned off.

Moreover, the above steps are merely for convenience of descriptions and do not limit the orders in actual operations. Therefore, steps S101 and S102 can be optionally performed at the same time, or step S102 is performed before step S201.

In some embodiments, as shown in FIG. 7, the method further includes S201 and S202.

In step S201, the backlight layer emits light to display in a region of the liquid crystal display not corresponding to the colorless region.

At this time, a liquid crystal driving element drives liquid crystals of the region not corresponding to the colorless region to be rotated, so that the image display of the region not corresponding to the colorless region in the liquid crystal display is realized.

Step S202, the image display element is turned off, liquid crystals in the liquid crystal layer corresponding to the colorless region are turned to a light transmitting state to realize light collection.

The display driving element controls the image display element to be turned off, at which time the image display element no longer emits light. The liquid crystal driving element drives the liquid crystals at the region corresponding to the colorless region in the liquid crystal layer to be turned to the light transmitting state, so that the light can penetrate the portion of the liquid crystal display corresponding to the colorless region.

This method can be optionally applied to the situation where the liquid crystal display and the lens are cooperated. At this time, the lens is disposed below the colorless region. When in use, the light passing through the outside of the liquid crystal display can penetrate the colorless region and then be received by the lens to realize light collection and thus acquire the images.

In some embodiments, as shown in FIG. 8, the method further includes S301 and S302.

In step S301, the backlight layer and the image display element are turned off.

At this time, the backlight layer no longer emits light and a region of the display screen that does not correspond to the colorless region is in a darkness state. A display driving element turns off the image display element.

In step S302, liquid crystals in the liquid crystal layer corresponding to the colorless region are turned to a light shielding state and screen off is achieved.

A light-transmittance of the liquid crystal layer corresponding to the colorless region is lowered by rotating the liquid crystals, so that a region of the liquid crystal display corresponding to the colorless region is also in a darkness state.

This method is applied to the situation in which the liquid crystal display is in a black screen state. A component or structure under the colorless region is shielded by rotating the liquid crystals corresponding to the colorless region in the liquid crystal layer to the light shielding state. Moreover, at this time, a region of the display screen corresponding to the colorless region tends to be in a darkness state and the difference between the display effect of the liquid crystal display corresponding to the colorless region and the display effect of the liquid crystal display not corresponding to the colorless region can also be mitigated, so the full screen effect will be optimized.

According to a third aspect, some embodiments of the present disclosure provide a terminal. As shown in FIG. 9, the terminal includes a lens 9 and the above liquid crystal display according to the first aspect. The lens 9 is disposed corresponding to the first light transmitting hole 11 in the liquid crystal display and the image display element 7 is disposed in a region surrounding the lens 9.

For example, the image display element 7 is disposed on a side of the lens 9, or is disposed surrounding the lens 9. When the image display element 7 is disposed surrounding the lens 9, a plurality of image display elements 7 is optionally employed and surrounds the lens 9. Alternatively, a separate image display element 7 can be used optionally and a through hole corresponding to the first light transmitting hole 11 is disposed on the image display element 7 and the lens 9 is inserted into the through hole.

In the example, the image display element 7 and the lens 9 do not affect each other and both the full screen display of the liquid crystal display and the image acquisition effect of the lens 9 can be achieved.

The liquid crystal display provided by embodiments of the present disclosure at least has following beneficial effects.

An image is normally displayed in a portion of the liquid crystal display provided by the embodiment of the present disclosure outside the colorless region, and an image is displayed in a portion of the liquid crystal display corresponding to the colorless region by means of an image display element, thereby realizing a full screen display effect of the liquid crystal display. Moreover, the first light transmitting hole in the backlight layer and the colorless region in the filter layer have light transmitting property, so when the liquid crystal display cooperates with the lens, the lens is placed under the colorless region, so that the lens receives the light penetrating through the colorless region, and then achieves the image acquisition function. That is, the liquid crystal display provided by the embodiment of the present disclosure takes into account the full screen display effect and the image acquisition function.

FIG. 10 is a diagram illustrating a terminal 2600 according to some embodiments of the present disclosure. For example, the device 2600 may be a mobile phone, a computer, a digital broadcast terminal, a messaging device, a gaming console, a tablet, a medical device, exercise equipment, a personal digital assistant, and the like.

Referring to FIG. 10, the device 2600 may include one or more of the following components: a processing component 2602, a memory 2604, a power component 2606, a multimedia component 2608, an audio component 2610, an input/output (I/O) interface 2612, a sensor component 2614, and a communication component 2616.

The processing component 2602 typically controls overall operations of the device 2600, such as the operations associated with display, telephone calls, data communications, camera operations, and recording operations. The processing component 2602 may include one or more processors 2620 to execute instructions to perform all or part of the steps in the above described methods. Moreover, the processing component 2602 may include one or more modules which facilitate the interaction between the processing component 2602 and other components. For instance, the processing component 2602 may include a multimedia module to facilitate the interaction between the multimedia component 2608 and the processing component 2602.

The memory 2604 is configured to store various types of data to support the operation of the device 2600. Examples of such data include instructions for any applications or methods operated on the device 2600, contact data, phonebook data, messages, pictures, video, etc. The memory 2604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2606 provides power to various components of the device 2600. The power component 2606 may include a power management system, one or more power sources, and any other components associated with the generation, management, and distribution of power in the device 2600.

The multimedia component 2608 includes a screen providing an output interface between the device 2600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2608 includes a front camera and/or a rear camera. The front camera and/or the rear camera may receive an external multimedia datum while the device 2600 is in an operation mode, such as a photographing mode or a video mode. Each of the front camera and the rear camera may be a fixed optical lens system or have focus and optical zoom capability.

The audio component 2610 is configured to output and/or input audio signals. For example, the audio component 2610 includes a microphone ("MIC") configured to receive an external audio signal when the device 2600 is in an operation mode, such as a call mode, a recording mode, and a voice recognition mode. The received audio signal may be further stored in the memory 2604 or transmitted via the communication component 2616. In some embodiments, the audio component 2610 further includes a speaker to output audio signals.

The I/O interface 2612 provides an interface between the processing component 2602 and peripheral interface modules, such as a keyboard, a click wheel, buttons, and the like. The buttons may include, but are not limited to, a home button, a volume button, a starting button, and a locking button.

The sensor component 2614 includes one or more sensors to provide status assessments of various aspects of the device 2600. For instance, the sensor component 2614 may detect an open/closed status of the device 2600, relative positioning of components, e.g., the display and the keypad, of the device 2600, a change in position of the device 2600 or a component of the device 2600, a presence or absence of user contact with the device 2600, an orientation or an acceleration/deceleration of the device 2600, and a change in temperature of the device 2600. The sensor component 2614 may include a proximity sensor configured to detect the presence of nearby objects without any physical contact. The sensor component 2614 may also include a light sensor, such as a CMOS or CCD image sensor, for use in imaging applications. In some embodiments, the sensor component 2614 may also include an accelerometer sensor, a gyroscope sensor, a magnetic sensor, a pressure sensor, or a temperature sensor.

The communication component 2616 is configured to facilitate communication, wired or wirelessly, between the device 2600 and other devices. The device 2600 can access a wireless network based on a communication standard, such as WiFi, 2G, 3G, 4G, or 5G, or a combination thereof. In some embodiments, the communication component 2616 receives a broadcast signal or broadcast associated information from an external broadcast management system via a broadcast channel. In some embodiments, the communication component 2616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 2604, executable by the processor 2620 in the device 2600, for performing the above-described methods. For example, the non-transitory computer-readable storage medium may be a ROM, a RAM, a CD-ROM, a magnetic tape, a floppy disc, an optical data storage device, and the like.

It should be understood that "a plurality of" mentioned herein means two or more. The term "and/or" describes the association relationship of associated objects, indicating that there may be three relationships. For example, A and/or B may indicate that there are three cases: A exists only, both A and B exist, and B exists only. The character "/" generally indicates that the contextual objects are in an "or" relationship. As used herein, "connected" may mean directly connected or indirectly connected.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A liquid crystal display, comprising:
   a backlight layer having a first light transmitting hole;
   a filter layer having a colorless region corresponding to the first light transmitting hole;
   an image display element located in a surrounding region of the first light transmitting hole underneath the backlight layer; and
   a light shielding member disposed on a side wall of the first light transmitting hole, to block light emitted from the backlight layer,
   wherein the image display element is capable of directly displaying an image and configured to project light onto the liquid crystal display corresponding to the colorless region; and
   wherein the image display element comprises:
   a sub-image display element, and a light gathering member disposed above a light-emitting surface of the sub-image display element,
   wherein the light gathering member has a curved or inclined light incident surface/light-exiting surface, and is disposed to project light emitted from the sub-image display element in an inclined direction onto the liquid crystal display corresponding to the colorless region uniformly.

2. The liquid crystal display according to claim 1, wherein the image display element comprises a color display state and/or a black and white display state.

3. The liquid crystal display according to claim 1, wherein the light gathering member is configured to uniformly project the light emitted from the sub-image display element onto the colorless region that is misaligned with the sub-image display element.

4. The liquid crystal display according to claim 1, wherein the liquid crystal display further comprises a liquid crystal driving element,
   wherein a liquid crystal layer in the liquid crystal display comprises a light transmitting state caused by driving of the liquid crystal driving element.

5. The liquid crystal display according to claim 4, wherein the liquid crystal layer further comprises a light shielding state caused by driving of the liquid crystal driving element, and a light transmittance under the light shielding state is smaller than a light transmittance under the light transmitting state.

6. The liquid crystal display according to claim 1, wherein the liquid crystal display further comprises a display driving element configured to drive the image display element to be turned on or off.

7. The liquid crystal display according to claim 1, wherein an inner polarizing layer of the liquid crystal display is formed with a second light transmitting hole corresponding to the first light transmitting hole.

8. The liquid crystal display according to claim 3, wherein the sub-image display element comprises at least one of: a mini light emitting diode element or element array, a micro light emitting diode element or element array, a liquid crystal display, or an organic light emitting diode array.

9. The liquid crystal display according to claim 3, wherein the light gathering member comprises at least one of: a prism, a microlens array, or a lens array.

10. The liquid crystal display according to claim 1, wherein a liquid crystal driving element of the liquid crystal display is connected to a display driving element of the image display element to realize communication; and
    the liquid crystal driving element and the display driving element are configured such that the liquid crystal display realizes display content synchronization in a region outside the colorless region and the image display element.

11. A display method, applied to a liquid crystal display, the liquid crystal display comprising: a backlight layer, formed with a first light transmitting hole; a filter layer, formed with a colorless region corresponding to the first light transmitting hole; and an image display element, located in a surrounding region of the first light transmitting hole underneath the backlight layer and capable of directly displaying an image; and a light shielding member disposed on a side wall of the first light transmitting hole, to block light emitted from the backlight layer, light of the image display element being projected on the liquid crystal display and corresponding to the colorless region, the method comprising:
    a backlight layer emitting light, the light being displayed in a region of the liquid crystal display outside the colorless region;
    an image display element emitting light and displaying, and a display image being projected on the liquid crystal display and corresponding to the colorless region;
    wherein the image display element comprises:
    a sub-image display element, and a light gathering member disposed above a light-emitting surface of the sub-image display element,
    wherein the light gathering member has a curved or inclined light incident surface/light-exiting surface, and is disposed to project light emitted from the sub-image display element in an inclined direction onto the liquid crystal display corresponding to the colorless region uniformly.

12. The method according to claim 11, wherein the image display element emitting light comprises:
    the image display element displaying a color image, or the image display element displaying a black and white image.

13. The method according to claim 11, wherein the image display element emitting light and displaying comprises:
    a liquid crystal driving element driving liquid crystals of a liquid crystal layer at the colorless region to be turned to a light transmitting state, and changing a polarization angle of the light emitted by the image display element, such that the light penetrates an outer polarizing layer.

14. The method according to claim 11, further comprising:
    a liquid crystal driving element of the liquid crystal display communicating with a display driving element of the image display element to transmit display information, and display contents of a region of the liquid crystal display outside the colorless region and the image display element synchronize.

15. The method according to claim 11, further comprising:

the backlight layer emitting light, the light being displayed on the region of the liquid crystal display outside the colorless region;

turning off the image display element, liquid crystals in the liquid crystal layer corresponding to the colorless region being turned to a light transmitting state to realize light collection.

16. The method according to claim 11, further comprising:

turning off the backlight layer and the image display element; and liquid crystals in the liquid crystal layer corresponding to the colorless region being turned to a light shielding state to realize screen off.

17. A terminal, comprising: a lens, and a liquid crystal display, the liquid crystal display comprising: a backlight layer, formed with a first light transmitting hole; a filter layer, formed with a colorless region corresponding to the first light transmitting hole; and an image display element, located in a surrounding region of the first light transmitting hole underneath the backlight layer and capable of directly displaying an image; and a light shielding member disposed on a side wall of the first light transmitting hole, to block light emitted from the backlight layer, light of the image display element being projected on the liquid crystal display and corresponding to the colorless region, wherein the lens is disposed corresponding to a first light transmitting hole in the liquid crystal display, and the image display element is disposed in a surrounding region of the lens; and wherein the image display element comprises:

a sub-image display element, and a light gathering member disposed above a light-emitting surface of the sub-image display element, wherein the light gathering member has a curved or inclined light incident surface/light-exiting surface, and is disposed to project light emitted from the sub-image display element in an inclined direction onto the liquid crystal display corresponding to the colorless region uniformly.

18. The terminal according to claim 17, wherein the image display element is disposed around the lens; or the image display element is disposed on one side of the lens; or the image display element is formed with a hollow region corresponding to the first light transmitting hole, and the lens is inserted into the hollow region.

19. The terminal according to claim 18, wherein the terminal is a full-screen mobile phone and comprises a camera corresponding to the first light transmitting hole.

* * * * *